(12) United States Patent
Mizushima

(10) Patent No.: US 9,876,947 B2
(45) Date of Patent: Jan. 23, 2018

(54) OPTICAL APPARATUS AND IMAGE CAPTURING APPARATUS

(71) Applicant: CANON KABUSHIKI KAISHA, Tokyo (JP)

(72) Inventor: Masayasu Mizushima, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 113 days.

(21) Appl. No.: 14/721,280

(22) Filed: May 26, 2015

(65) Prior Publication Data

US 2015/0346454 A1   Dec. 3, 2015

(30) Foreign Application Priority Data

May 29, 2014 (JP) ................................ 2014-110730

(51) Int. Cl.
*G02B 7/02* (2006.01)
*H04N 5/225* (2006.01)
*G02B 13/16* (2006.01)

(52) U.S. Cl.
CPC ........... *H04N 5/2254* (2013.01); *G02B 7/021* (2013.01); *G02B 7/022* (2013.01); *G02B 13/16* (2013.01)

(58) Field of Classification Search
CPC ........ G02B 7/102; G02B 7/08; G02B 13/001; G02B 7/022; G02B 21/0012; G02B 27/646; G02B 6/32; G02B 7/023; G02B 6/3652; G02B 6/4204; G02B 7/021; G02B 13/0065; G02B 13/16; G02B 15/173; G02B 21/0052; G02B 21/16; G02B 21/248; G02B 21/26; G02B 21/367

USPC .................................. 359/808, 811, 819–824
See application file for complete search history.

(56) References Cited

U.S. PATENT DOCUMENTS

| | | | | |
|---|---|---|---|---|
| 5,757,559 A | * | 5/1998 | Nomura .................. | G02B 7/021 359/811 |
| 7,453,655 B2 | | 11/2008 | Akimoto et al. | |
| 2005/0270668 A1 | * | 12/2005 | Seita .................... | B29C 65/1635 359/811 |

(Continued)

FOREIGN PATENT DOCUMENTS

| JP | 04240608 A | 8/1992 |
|---|---|---|
| JP | 2004184787 A | 7/2004 |
| JP | 2004205774 A | 7/2004 |

*Primary Examiner* — Brandi Thomas
(74) *Attorney, Agent, or Firm* — Rossi, Kimms & McDowell LLP

(57) ABSTRACT

The optical apparatus includes an optical system forming an optical image on a rectangular image capturing surface having long and short sides, a plastic lens, a holder holding the plastic lens, and a pressing member pressing the plastic lens to the holder. One of the plastic lens and the holder includes first and second protrusions located on mutually opposite sides across an optical axis in a first direction parallel to the short sides. Another of the plastic lens and the holder includes a first hole portion into which the first protrusion is inserted to prevent a displacement thereof in a second direction parallel to the long sides and the first direction and a second hole portion into which the second protrusion is inserted to prevent a displacement thereof in the second direction and to allow a relative displacement thereof in the first direction.

10 Claims, 4 Drawing Sheets

(56) References Cited

U.S. PATENT DOCUMENTS

| | | | | |
|---|---|---|---|---|
| 2006/0125951 A1* | 6/2006 | Akimoto | ............... | G02B 7/026 |
| | | | | 348/360 |
| 2010/0242751 A1* | 9/2010 | Suzuki | ................... | B41F 17/00 |
| | | | | 101/35 |
| 2014/0209946 A1* | 7/2014 | Chou | ..................... | H01L 33/54 |
| | | | | 257/98 |

* cited by examiner

OPTICAL APPARATUS AND IMAGE CAPTURING APPARATUS

BACKGROUND OF THE INVENTION

Field of the Invention

The present invention relates to an optical apparatus that includes an optical system including a plastic lens, and particularly relates to a structure for holding the lens.

Description of the Related Art

A plastic lens is held by a holder such as a lens holding frame by, for example, engaging a protrusion (pin) integrally provided to the lens with a hole portion formed on the holder.

Japanese Patent Laid-open No. 2004-184787 discloses a structure including a plastic lens provided with four pins (first to fourth pins), and a holder provided with four hole portions (first to fourth hole portions) respectively corresponding to the four pins. The first pin has its entire circumference engaged with the first hole portion, and the fourth pin is inserted into the fourth hole portion as an elongated hole portion extending in a direction toward the first hole portion, thereby positioning the lens relative to the holder. The second and third pins are inserted into the second and third hole portions having inner diameters larger than outer diameters of the second and third pins. Then, heads of the first to third pins inserted into the first to third hole portions are melted by thermal caulking, and thereby the lens and the holder are fixed.

Japanese Patent Laid-open No. 04-240608 discloses a structure including a plastic lens provided with three pins (first to third pins), and a holder provided with three hole portions (first to third hole portions) respectively corresponding to the three pins. The first to third hole portions are each formed as an elongated hole portion extending in a lens radial direction from an optical axis. The first to third pins are respectively inserted into the first to third hole portions with their displacement in the lens radial direction being allowed, and thereby the lens is held by the holder. The lens is fixed to the holder by being pressed to the holder by an end of an elastic member whose another end is in contact with a fixed member.

However, in the structure disclosed in Japanese Patent Laid-open No. 2004-184787, a difference between linear expansion coefficients of the lens and the holder that are formed of materials different from each other may cause, for example, the lens to expand more largely than the holder due to an increase in an ambient temperature. In this case, the structure does not allow the lens with its first to third pins fixed to the holder by the thermal caulking to compensate an expansion force in its lens radial direction orthogonal to its optical axis direction. Thus, the lens expands in the optical axis direction. This expansion of the lens in the optical axis direction may cause a change of a curvature of its lens surface and a distortion thereof, which degrades an optical performance.

On the other hand, in the structure disclosed in Japanese Patent Laid-open No. 04-240608, all the first to third hole portions (elongated hole portions) formed in the holder allow the first to third pins provided to the lens to be displaced in the lens radial direction. With this configuration, the problem with the structure disclosed in Japanese Patent Laid-open No. 2004-184787 can be avoided. However, positioning the lens relative to the holder without gaps in the structure disclosed in Japanese Patent Laid-open No. 04-240608 requires significantly rigorous accuracies on a phase relation between the first to third pins of the lens and the first to third hole portions of the holder and on a relation between the outside diameters of the pins and widths of the elongated hole portions, which makes manufacturing of such a structure difficult.

SUMMARY OF THE INVENTION

The present invention provides an optical apparatus capable of accurately positioning and holding a plastic lens by a holder without a rigorous manufacture accuracy being required and of avoiding degradation of its optical performance due to a temperature change. The present invention further provides an image capturing (taking) apparatus including the optical apparatus.

The present invention provides as an aspect thereof an optical apparatus including an optical system configured to form an optical image on a rectangular image capturing surface having long sides and short sides, a plastic lens included in the optical system, a holder holding the plastic lens, and a pressing member pressing the plastic lens to the holder in an optical axis direction of the optical system. A first member that is one of the plastic lens and the holder includes a first protrusion and a second protrusion each extending in the optical axis direction and are located on mutually opposite sides across an optical axis in a first direction parallel to the short sides. A second member that is another of the plastic lens and the holder includes (a) a first hole portion into which the first protrusion is inserted to prevent a displacement of the first protrusion in a second direction parallel to the long sides and the first direction and (b) a second hole portion into which the second protrusion is inserted to prevent a displacement of the second protrusion in the second direction and to allow a relative displacement of the second protrusion in the first direction.

The present invention provides as another aspect thereof an image capturing apparatus including the above optical apparatus and an image sensor having a rectangular image capturing surface and configured to photoelectrically convert an optical image, Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Embodiment 1

Figure 1:
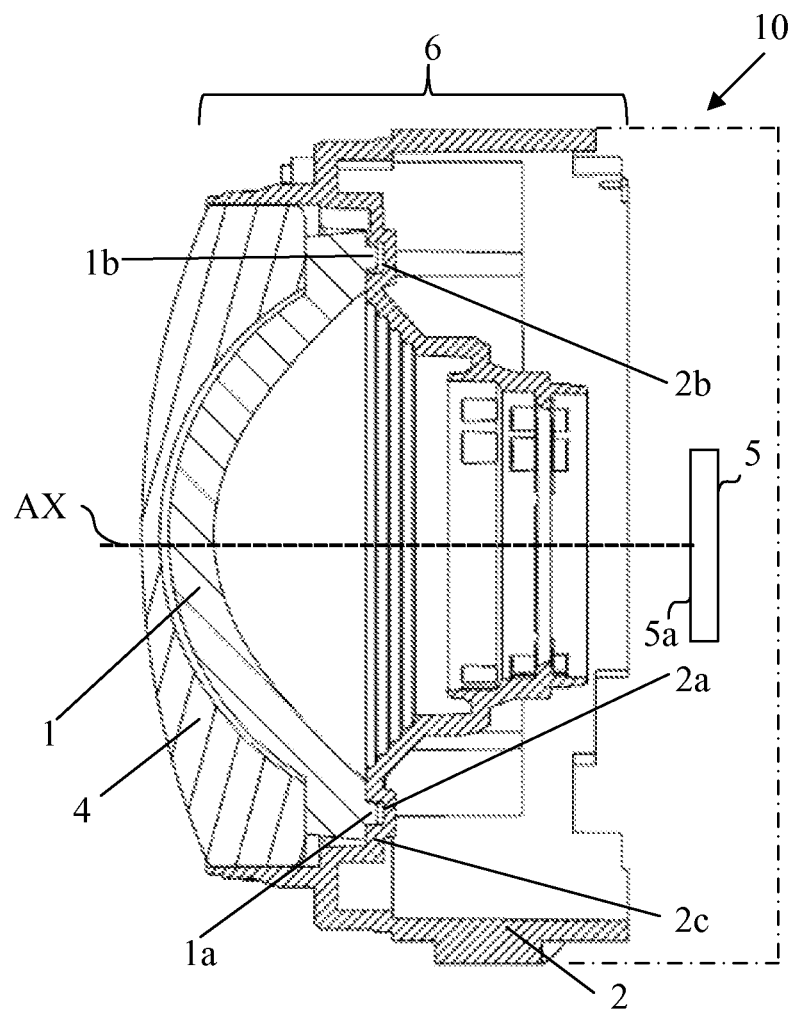
FIG. 1 is a sectional view of a lens barrel (and an image capturing apparatus) of Embodiment 1 of the present invention.
Figure 2:
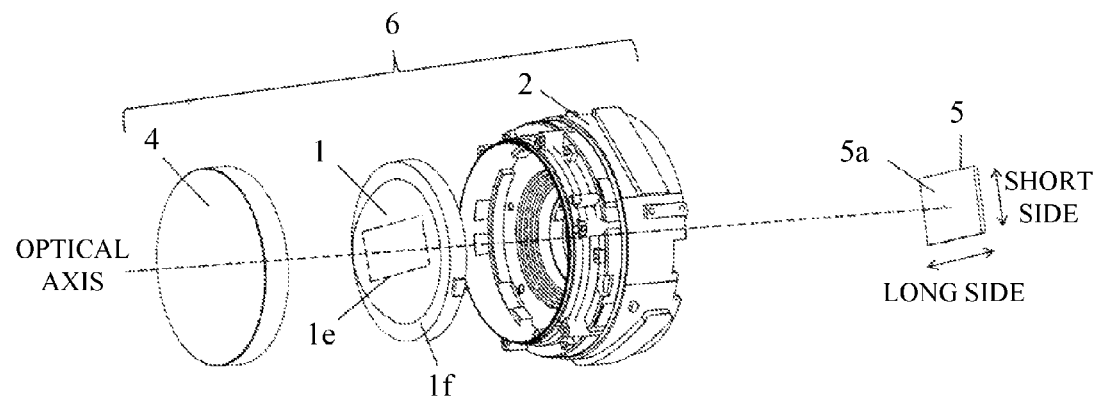
FIG. 2 is an exploded perspective view of the lens barrel of Embodiment 1.

FIGS. 1 and 2 illustrate a configuration of a lens barrel as an optical apparatus of Embodiment 1 of the present invention. In FIGS. 1 and 2, a left side corresponds to an object side (subject side), and a right side corresponds to an image side (image capturing surface side).

A lens barrel 6 is integrally provided to an image capturing apparatus 10 such as a film camera, a digital still camera, and an analog or digital video camera. Reference numeral 5 denotes an image sensor that is provided in the image capturing apparatus 10 in this embodiment and includes a rectangular image capturing surface 5a having long sides and short sides as illustrated in FIG. 2. The image sensor 5 is constituted by a photoelectric conversion element such as a CCD sensor or a CMOS sensor. The lens barrel 6 may be an interchangeable lens detachably attached to a lens interchangeable camera such as a single-lens reflex camera or a mirrorless camera.

Reference numeral 1 denotes a plastic lens, and reference numeral 4 denotes a glass lens. These lenses 1 and 4 are included in an optical system that forms an object image (optical image) on the rectangular image capturing surface 5a. Although not illustrated, the optical system may include another lens, an aperture stop, an optical filter and other optical elements. Reference numeral AX denotes an optical axis of the optical system (and the lenses), and hereinafter, a direction in which the optical axis AX extends is referred to as "an optical axis direction". Reference numeral 2 denotes a lens holder that holds the lenses 1 and 4 and is formed of a plastic material different from a material of the plastic lens 1.

Figure 3:
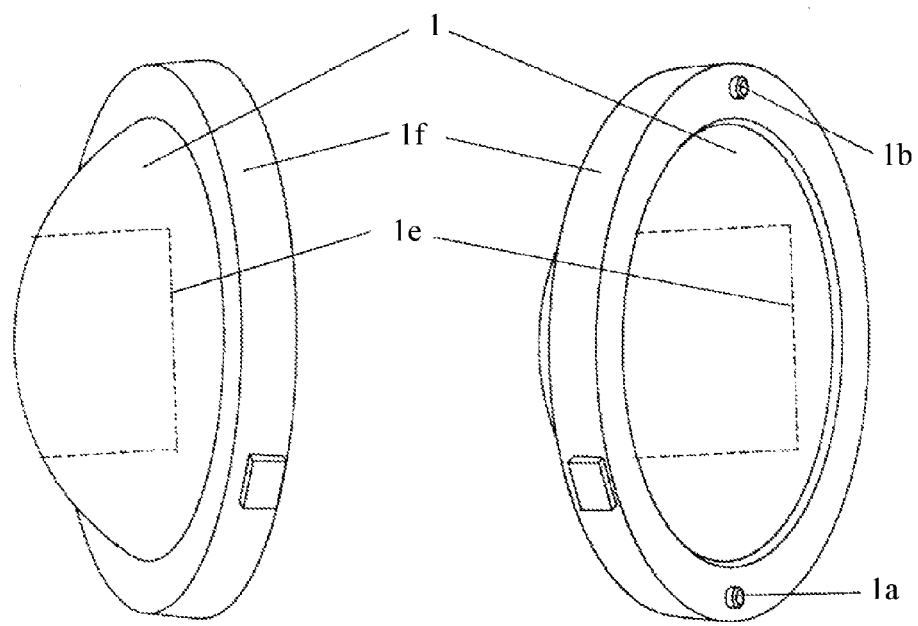
FIG. 3 is perspective views of a plastic lens in Embodiment 1 viewed from an object side and an image side.

FIG. 3 illustrates the plastic lens 1 diagonally viewed from the object side and the image side. A rectangular frame 1e illustrated by a dotted line on a lens portion of the plastic lens 1 represents a region through which light rays to be imaged on the image capturing surface 5a passes and that has long sides and short sides respectively parallel to the long sides and the short sides of the image capturing surface 5a.

The plastic lens 1 includes a peripheral portion 1f around the lens portion. A first pin 1a as a first protrusion and a second pin 1b as a second protrusion are integrally formed with the lens 1 on its lens holder (2) side surface (that is, an image side surface) of the peripheral portion 1f. The first and second pins 1a and 1b each have a cylindrical shape and each extend in the optical axis direction. The first and second pins 1a and 1b are provided at a center in a direction (second direction) parallel to the long sides of the image capturing surface 5a so as to be located across the optical axis AX in a direction (first direction) parallel to the short sides of the image capturing surface 5a.

As shown in FIG. 1, a plastic lens (1) side surface (that is, an object side surface) of a flange portion 2c of the lens holder 2 is provided with a reference hole portion 2a as a first hole portion which has a circular opening shape and an elongated hole portion 2b as a second hole portion which has an elongated opening shape in the direction parallel to the short sides of the image capturing surface 5a. The reference hole portion 2a and the elongated hole portion 2b are provided at the center in the direction parallel to the long sides of the image capturing surface 5a so as to be located across the optical axis AX in the direction parallel to the short sides of the image capturing surface 5a.

The reference hole portion 2a into which the first pin 1a is inserted is engaged with an entire outer circumferential surface of the first pin 1a to prevent a displacement of the first pin 1a in a plane orthogonal to the optical axis AX (in other words, in the direction parallel to the long sides of the image capturing surface 5a and in the direction parallel to the short sides thereof). On the other hand, the elongated hole portion 2b into which the second pin 1b is inserted is engaged with an outer circumferential surface of the second pin 1b in a width direction of the elongated hole portion 2b to prevent a displacement of the second pin 1b in the direction parallel to the long sides of the image capturing surface 5a. The elongated hole portion 2b has a length larger than an outer diameter of the second pin 1b in the direction parallel to the short sides of the image capturing surface 5a, thereby allowing a relative displacement of the second pin 1b in the direction parallel to the short sides. In this manner, the first and second pins 1a and 1b are respectively inserted into the reference hole portion 2a and the elongated hole portion 2b, and thereby the first pin 1a and the reference hole portion 2a are used as a reference to position the plastic lens 1 relative to the lens holder 2 in the plane orthogonal to the optical axis AX.

This embodiment describes a case of using the plastic lens 1 as a first member including the first and second pins 1a and 1b and using the lens holder 2 as a second member including the reference hole portion 2a and the elongated hole portion 2b. However, the plastic lens 1 may be used as the second member, and the lens holder 2 may be used as the first member.

Description will be made of a method of assembling the lens barrel 6. First, the plastic lens 1 is incorporated into the lens holder 2. Specifically, the first and second pins 1a and 1b of the plastic lens are respectively inserted into the reference hole portion 2a and the elongated hole portion 2b of the lens holder 2. Then, the lens holder side surface of the peripheral portion 1f of the plastic lens 1 is made in contact with the plastic lens side surface of the flange portion 2c of the lens holder 2. Thus, the lens holder 2 is held by a body of the image capturing apparatus 10 so as not to rotate around the optical axis AX. This configuration fixes a phase relation between the plastic lens 1 and the image capturing surface 5a around the optical axis AX. Accordingly, the first and second pins 1a and 1b of the plastic lens 1 are respectively always disposed so as to be located on an opposite side of the reference and elongated hole portions 2a and 2b of the lens holder 2 across the optical axis AX in the direction parallel to the short sides of the image capturing surface 5a (frame 1e).

Next, the glass lens 4 is incorporated into the lens holder 2 and fixed relative to the lens holder in the optical axis direction by, for example, bonding, swaging or using a pressing ring. Specifically, a plastic lens (1) side surface of a peripheral portion of the glass lens 4 as a pressing member is made in contact with a glass lens (4) side surface of the peripheral portion 1f of the plastic lens 1 with being pressed thereagainst in the optical axis direction. This configuration fixes the plastic lens 1 relative to the lens holder 2 in the optical axis direction.

This embodiment describes the case of using the glass lens 4 as the pressing member, but another pressing member such as a pressing ring may be used to press the plastic lens 1 to the lens holder 2 in the optical axis direction.

When an ambient temperature of the lens barrel 6 (image capturing apparatus 10) changes, one of the plastic lens 1 and the lens holder 2, which are formed of the materials having mutually different linear expansion coefficients (expansion rates), expands or contracts more largely than the other in a direction (radial direction) orthogonal to the optical axis AX. The difference between expansion or contraction amounts is absorbed by a relative displacement of the second pin 1b and the elongated hole portion 2b relative to the first pin 1a and the reference hole portion 2a as the reference in the direction parallel to the short sides of the image capturing surface 5a. This absorption prevents the plastic lens 1 to expand or contract in the optical axis direction, thereby avoiding a change of a curvature of its lens surface and a distortion thereof.

However, the relative displacement shifts an optical axis of the plastic lens 1 from the optical axis AX of the optical system in the direction parallel to the short sides of the image capturing surface 5a. Specifically, when the expansion rate of the plastic lens 1 is higher than that of the lens holder 2, the optical axis of the plastic lens 1 is shifted from the original optical axis AX (that is, an optical axis of the glass lens 4) in a direction of becoming away from the first pin 1a and the reference hole portion 2a at high temperatures and in a direction opposite thereto at low temperatures. When the expansion rate of the plastic lens 1 is lower than that of the lens holder 2, the optical axis of the plastic lens 1 is shifted from the optical axis AX in a direction of becoming closer to the first pin 1a and the reference hole portion 2a at high temperatures and in a direction opposite thereto at low temperatures. On the other hand, since the relative displacement of the second pin 1b and the elongated hole portion 2b is not allowed in the direction parallel to the long sides of the image capturing surface 5a, the difference between expansion or contraction amounts of the plastic lens 1 and the lens holder 2 does not generate the shift between the optical axes in this direction.

As described above, in the plastic lens 1 and the lens holder 2 in this embodiment, with respect to the first pin 1a and the reference hole portion 2a into which the first pin 1a is inserted, the second pin 1b and the elongated hole portion 2b into which the second pin 1b is inserted are disposed in the direction parallel to the short sides of the image capturing surface 5a. In addition, the elongated hole portion 2b has a shape long in the direction parallel to the short sides of the image capturing surface 5a. Thus, when the ambient temperature changes, the optical axis of the plastic lens 1 is shifted from the optical axis AX of the optical system in the direction parallel to the short sides of the image capturing surface 5a, but the shift can be prevented in the direction parallel to the long sides of the image capturing surface 5a. In other words, a direction in which the optical axis of the plastic lens 1 is shifted from the optical axis AX of the optical system (hereinafter, described as that an axis shift is generated) can be restricted to the direction parallel to the short sides of the image capturing surface 5a.

The axis shift of the plastic lens 1 degrades optical performance of the optical system. Typically, the degradation of the optical performance has a larger influence on the optical image (that is, on image quality) at a position on the image capturing surface 5a farther away from a center (at which the optical axis AX passes through) thereof. In other words, the degradation of the image quality due to the axis shift is not significant near the central part of the image capturing surface 5a, but is significant in a marginal part thereof in a direction of the axis shift. In particular, the degradation of the image quality is more noticeable at a position further distant from a position of the shifted optical axis of the plastic lens 1. However, this embodiment restricts the direction in which the axis shift is generated to the direction parallel to the short sides of the image capturing surface 5a. This restriction can make the degradation of the image quality less significant in the marginal part of the image capturing surface 5a as compared to a case in which the axis shift is generated in other directions such as the direction parallel to the long sides of the image capturing surface 5a and a diagonal direction of the image capturing surface 5a.

Furthermore, the plastic lens 1 and the glass lens 4 each expand or contract in the radial direction with the change of the ambient temperature, as compared to their sizes at room temperature. However, the difference between the expansion rates causes the plastic lens 1 to more largely expand or contract than the glass lens 4. To compensate this large expansion or contraction, the glass lens side surface of the peripheral portion 1f of the plastic lens 1 is required to have a sufficient slidability relative to the plastic lens side surface of the peripheral portion of the glass lens 4. This is because a low slidability therebetween leads to friction during the expansion or contraction of the plastic lens 1 in the radial direction, so that the plastic lens 1 expands or contracts in the optical axis direction, and thereby the change of the curvature of its lens surface and the distortion thereof are generated as mentioned above.

The glass lens side surface of the peripheral portion 1f of the plastic lens 1 can be formed as a smooth surface having a sufficient slidability by smoothing a corresponding surface of a mold for shaping the plastic lens 1. However, the plastic lens side surface of the peripheral portion of the glass lens 4 is likely to be formed as a rough surface having a low slidability due to manufacturing reasons of the glass lens 4.

Thus, in this embodiment, finish processing is provided to smooth the plastic lens side surface of the peripheral portion of the glass lens 4, similarly to the glass lens side surface of the peripheral portion 1f of the plastic lens 1. This finish processing achieves a sufficient slidability between contact surfaces of the peripheral portion 1f of the plastic lens 1 and the peripheral portion of the glass lens 4, thereby avoiding the friction during expansion or contraction of the plastic lens 1 in the radial direction.

Embodiment 2

Figure 4:
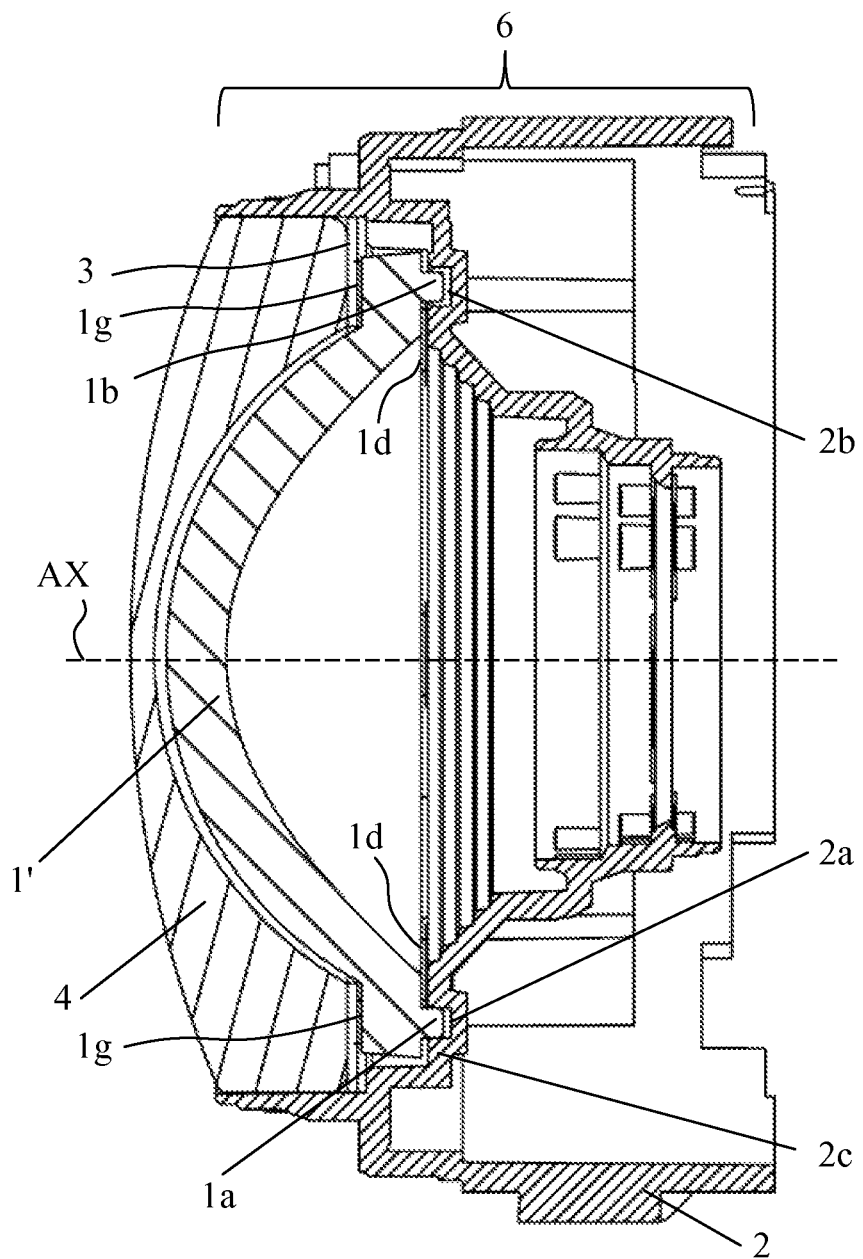
FIG. 4 is a sectional view of a lens barrel of Embodiment 2 of the present invention.
Figure 5:
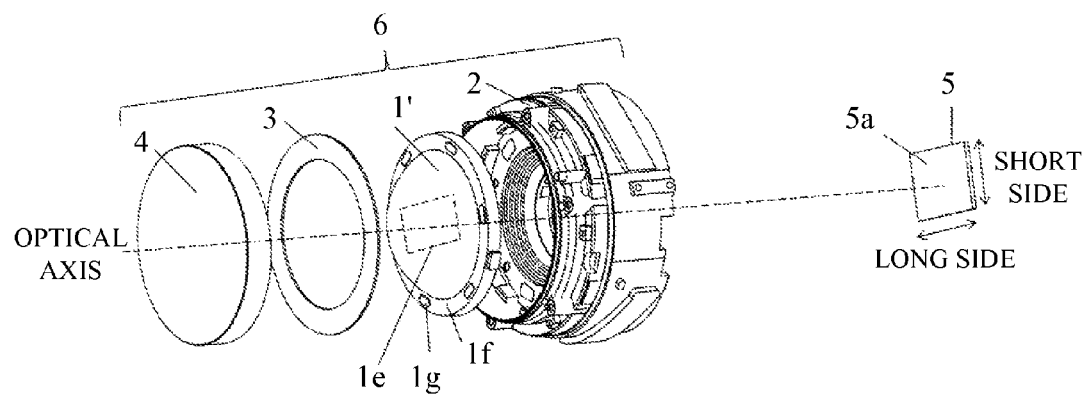
FIG. 5 is an exploded perspective view of the lens barrel of Embodiment 2.
Figure 6:
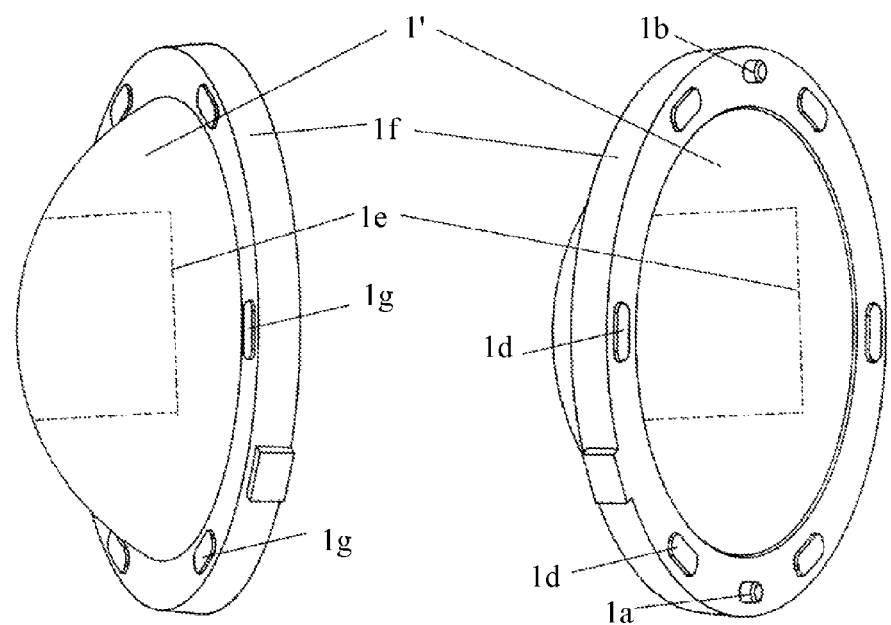
FIG. 6 is perspective views of a plastic lens in Embodiment 2 viewed from an object side and an image side.

FIGS. 4 and 5 illustrate a configuration of a lens barrel as an optical apparatus of Embodiment 2 of the present invention. In FIGS. 4 and 5, a left side corresponds to an object side (subject side), and a right side corresponds to an image side (image capturing surface side). FIG. 6 illustrates a plastic lens 1' used in this embodiment diagonally viewed from the object side and the image side. In this embodiment, the same components as those in Embodiment 1 are denoted by the same reference numerals as those in Embodiment 1, and description thereof will be omitted.

As described in Embodiment 1, the plastic lens side surface of the peripheral portion of the glass lens 4 is desired to be smoothed through the finish processing. However, this additional finish processing leads to increased number of processes and cost for manufacturing the glass lens 4 and the lens barrel 6. Thus, in this embodiment, a sliding sheet 3 having a ring shape is disposed as a sliding member providing slidability between a glass lens (4) side surface of a peripheral portion 1f of a plastic lens 1' and a plastic lens (1') side surface of the peripheral portion of the glass lens 4.

This configuration achieves a sufficient slidability between the glass lens side surface of the peripheral portion 1f of the plastic lens 1' and the plastic lens side surface of the peripheral portion of the glass lens 4 more easily than providing the finish processing on the glass lens 4.

Moreover, in this embodiment, convex contact portions 1g having convex plane shapes protruding in the optical axis direction are provided at plural positions in a circumferential direction around the optical axis on the glass lens side (sliding sheet (3) side) surface of the peripheral portion 1f of the plastic lens 1'. Planes of the convex contact portions 1g serve as contact surfaces with the sliding sheet 3. These convex contact portions 1g achieve a reduced contact area as compared to that when the entire sliding sheet side surface of the peripheral portion 1f of the plastic lens 1' is in contact with the sliding sheet 3, thereby achieving a more sufficient slidability. In this embodiment, the sliding sheet 3 and the convex contact portions 1g are both provided, but only one of them may be provided. When only the convex contact portions are provided, the convex contact portions may be provided to the glass lens as the pressing member.

Furthermore, in this embodiment, convex contact portions 1d having convex plane shapes protruding in the optical axis direction are provided at plural positions in the circumferential direction around the optical axis on a lens holder (2) side surface of the peripheral portion 1f of the plastic lens 1'. Planes of the convex contact portions 1d serve as contact surfaces with a plastic lens (1') side surface of the flange portion 2c of the lens holder 2. These convex contact portions 1d achieve a reduced contact area as compared to that when the entire lens holder side surface of the peripheral portion 1f of the plastic lens 1' is in contact with the flange portion 2c of the lens holder 2. This achieves a more sufficient slidability of the peripheral portion 1f of the plastic lens 1' relative to the lens holder 2.

The convex contact portions 1d and 1g are desired to be provided at substantially equal intervals at three or more positions in the circumferential direction around the optical axis.

Each of the above-described embodiments uses the first protrusion and the first hole portion as the reference to accurately position the plastic lens relative to the holder. The embodiment allows the relative displacement of the second protrusion and the second hole portion due to expansion or contraction of the plastic lens in the radial direction (direction parallel to the short sides of the image capturing surface), thereby avoiding expansion or contraction of the plastic lens in the optical axis direction, and the change of the curvature and distortion of its lens surface, which would be caused by the expansion or contraction. Moreover, when the expansion or contraction of the plastic lens in the radial direction shifts the optical axis of the plastic lens from its position before the expansion or contraction, the shift is restricted in the direction parallel to the short sides of the image capturing surface. Thus, an influence on an optical image formed on the image capturing surface can be reduced as compared to a case in which the optical axis is shifted in other directions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-110730, filed on May 29, 2014, which is hereby incorporated by reference wherein in its entirety.

What is claimed is:

1. An optical apparatus comprising:
an optical system configured to form an optical image on a rectangular image capturing surface having long sides and short sides;
a plastic lens included in the optical system;
a holder holding the plastic lens; and
a pressing member pressing the plastic lens to the holder in an optical axis direction of the optical system,
wherein a first member that is one of the plastic lens and the holder includes a first protrusion and a second protrusion each extending in the optical axis direction and are located on mutually opposite sides across an optical axis in a first direction parallel to the short sides, and
a second member that is the other one of the plastic lens and the holder includes (a) a first hole portion into which the first protrusion is inserted, the first hole portion having a shape such that the first hole portion impedes a displacement of the first protrusion in a second direction parallel to the long sides and in the first direction and (b) a second hole portion into which the second protrusion is inserted, the second hole portion having a shape such that the second hole portion impedes a displacement of the second protrusion in the second direction and allows a relative displacement of the second protrusion in the first direction.

2. The optical apparatus according to claim 1, wherein the pressing member is a glass lens included in the optical system.

3. The optical apparatus according to claim 1, further comprising a sliding member providing slidability between the pressing member and the plastic lens.

4. The optical apparatus according to claim 1, wherein contact portions are provided at plural positions in a direction around the optical axis in one of the first and second members, each contact portion having a convex plane shape protruding in the optical axis direction and making contact with another of the first and second members in the optical axis direction.

5. The optical apparatus according to claim 1, wherein contact portions are provided at plural positions in a direction around the optical axis in one of the plastic lens and the pressing member, each contact portion having a convex plane shape protruding in the optical axis direction and making contact with another of the plastic lens and the pressing member in the optical axis direction.

6. The optical apparatus according to claim 1, further comprising a sliding member providing slidability between the plastic lens and the pressing member,
wherein contact portions are provided at plural positions in a direction around the optical axis in the plastic lens, each contact portion having a convex plane shape protruding in the optical axis direction and making contact with the sliding member in the optical axis direction.

7. The optical apparatus according to claim 1, wherein the second hole portion has an elongated opening shape in the first direction such that the second hole portion is engaged with an outer circumferential side of the second protrusion in a width direction of the second hole portion, and a length of the second hole portion in the first direction is larger than an outer diameter of the second protrusion in the first direction.

8. The optical apparatus according to claim 7, wherein the first hole portion has a circular opening shape and is engaged with an entire outer circumferential surface of the first protrusion.

9. An optical apparatus comprising:
an optical system configured to form an optical image on a rectangular image capturing surface having long sides and short sides;
a plastic lens included in the optical system;
a holder holding the plastic lens; and
a pressing member pressing the plastic lens to the holder in an optical axis direction of the optical system,
wherein a first member that is one of the plastic lens and the holder includes a first protrusion and a second protrusion each extending in the optical axis direction and are located on mutually opposite sides across an optical axis in a first direction parallel to the short sides, and a second member that is the other one of the plastic lens and the holder includes (a) a first hole portion into which the first protrusion is inserted, the first hole portion having a shape such that the first hole portion holds the first protrusion in a second direction parallel to the long sides and in the first direction and (b) a second hole portion into which the second protrusion is inserted, the second hole portion having a shape such that the second hole portion holds the second protrusion in the second direction and allows a relative displacement of the second protrusion in the first direction.

10. An image capturing apparatus comprising:
an optical apparatus; and
an image sensor having a rectangular image capturing surface having long sides and short sides and configured to photoelectrically convert an optical image, wherein the optical apparatus comprises:
an optical system configured to form the optical image on the image capturing surface;
a plastic lens included in the optical system;
a holder holding the plastic lens; and
a pressing member pressing the plastic lens to the holder in an optical axis direction of the optical system,
wherein a first member that is one of the plastic lens and the holder includes a first protrusion and a second protrusion each extending in the optical axis direction and are located on mutually opposite sides across an optical axis in a first direction parallel to the short sides, and
a second member that is the other one of the plastic lens and the holder includes (a) a first hole portion into which the first protrusion is inserted, the first hole portion having a shape such that the first hole portion holds the first protrusion in a second direction parallel to the long sides and in the first direction and (b) a second hole portion into which the second protrusion is inserted, the second hole portion having a shape such that the second hole portion holds the second protrusion in the second direction and allows a relative displacement of the second protrusion in the first direction.

* * * * *